United States Patent [19]

Russell, Jr. et al.

[11] Patent Number: 4,771,267
[45] Date of Patent: Sep. 13, 1988

[54] ANALOG OFFSET COMPENSATION TECHNIQUE

[75] Inventors: Roger B. Russell, Jr., Thousand Oaks; Robert A. Eckel, Canoga Park, both of Calif.

[73] Assignee: Hughes Aircraft Company, Los Angeles, Calif.

[21] Appl. No.: 946,232

[22] Filed: Dec. 24, 1986

[51] Int. Cl.[4] .............................................. H03M 1/12
[52] U.S. Cl. ..................................... 341/118; 382/50; 341/155
[58] Field of Search ................. 340/347 AD, 347 CC; 381/41, 50

[56] References Cited
U.S. PATENT DOCUMENTS 4,353,060 10/1982 Endoh ...................... 340/347 CC X
4,503,421 3/1985 Hareyama et al. ........ 340/347 CC X Primary Examiner—William M. Shoop, Jr.
Assistant Examiner—Richard K. Blum
Attorney, Agent, or Firm—Charles D. Brown; A. W. Karambelas

[57] ABSTRACT

The invention claims a method (and system) for correcting an analog signal for undesired signal components comprising the steps of (and means for) receiving the analog signal; digitizing the analog signal to generate a raw digital signal; processing the raw digital signal to generate a digital correction signal; converting the digital correction signal to an analog correction signal; and applying the analog correction signal to the analog signal to generate a corrected analog signal.

The method and system may be adapted to correct for a set of undesired components, or to correct a train of analog signals. The method and system may be used for correcting digital signals. In a particular embodiment, the method and system may be used to correct for offset and/or gain nonuniformities in the output signals from detector elements in a focal plane array.

7 Claims, 2 Drawing Sheets

ANALOG OFFSET COMPENSATION TECHNIQUE

BACKGROUND OF THE INVENTION

This invention relates to techniques for correcting signals for undesirable components or characteristics. Although this invention finds particular application to multi-element electro-optical imaging systems and, more specifically, to correction for nonuniformities introduced by individual detector elements in an electro-optical imaging system, it will be seen that the invention is useful for providing correction of analog or digital signal trains for any set of undesired characteristics.

It is well known in the art that the numerous elements in a multi-element focal plane array limit system performance due to a lack of uniformity among the individual elements. For example, the responsivity, DC offset variations, and gain variations in a typical infrared detector array give rise to fixed pattern noise of a magnitude which can readily mask low contrast thermal images. In the past, such nonuniformities have been corrected by means of a plurality of background temperature references or by synthesizing at least one such background temperature reference. See, e.g., pp. 4, 298 and 887—"Non-Uniformity Correction in a Multi-element Detector Array," Rode, Nov. 3, 1981.

Analog methods which synthesize the average background temperature for use in correcting for nonuniformities essentially subtract the average response for each detector element from the current response. However, generating a weighted average requires information collection and recording for an initial averaging interval, involving a delay in responsivity for the imaging system. Further, these techniques may require a total reset when the scene environment changes significantly (askewing the weighted average) or when there is no scene change (staring at a blank scene).

Nonuniformity correction has been accomplished in the digital domain by employing digital correction of the digitized video with the terms updated every frame against a thermal reference. In this approach, the digital word corresponding to each picture element is offset and gain compensated individually. However, known digital techniques have proved inefficient where the nonuniformities themselves are several times larger than the desirable signal component, since a portion of the finite dynamic range of the digital system is used in the compensation. The effective dynamic range available for the signal is reduced since the bit precision of the digital signal after compensation will be less than the starting bit precision of the analog-to-digital converter. In addition, techniques using analog feedback of the digitized signal for correction have required the bit size of the digital-to-analog converter to be at least several bits larger than the bit size of the digital word. Unfortunately, high speed digital-to-analog converters larger than 12 bits are not readily available. Even where available, such long bit D/A converters lack linearity and monotonicity over the entire bit range.

Therefore, a need has developed in the art for an improved technique to compensate for nonuniformities in a multi-element detector array in particular and, more generally, an improved technique to correct analog or long length digital signals for undesirable signal characteristics.

SUMMARY OF THE INVENTION

It is a general object of this invention to provide a method and system for correcting an analog or digital signal, or a train of such signals, for a set of undesired signal characteristics.

More particularly, it is an object of this invention to provide a new technique to correct for nonuniformities in the output signals from the elements of a detector array focused on a scene.

In order to correct an analog signal for undesired characteristics, the invention includes the steps of and means for:

(a) receiving the analog signal;
(b) digitizing the analog signal to generate a raw digital signal;
(c) processing the raw digital signal to generate a digital correction signal;
(d) converting the digital correction signal to an analog correction signal; and
(e) applying the analog correction signal to the analog signal to generate a corrected analog signal.

In a more particular embodiment, the step of processing the raw digital signal includes comparing at least one bit string of the raw digital signal to a reference number. The method and corresponding system may be used to correct a train of analog signals. The method and corresponding system may be further useful for correcting digital signals.

The length of the bit string used to generate the digital correction signal and the digital correction signal length itself may be kept less than the bit length of the raw digital signal.

BRIEF DESCRIPTION OF THE DRAWINGS

Additional objects, features and advantages of the present invention will become apparent by reference to the detailed description of the preferred embodiment in conjunction with the accompanying drawings.

In the drawings.

DESCRIPTION OF THE PREFERRED EMBODIMENT

This invention is concerned with the general problem of correcting signals for undesirable characteristics, and more particularly, with the problem of correcting for nonuniformities among the elements of a multiple detector array in order to accurately display the scene information received by the array. Although, as will be appreciated by those skilled in the art, the applicability of the invention is not limited to any particular embodiment, the preferred embodiments have been developed in connection with infrared imaging systems. For this reason, the discussion here will focus on the application of the invention to correcting for nonuniformities in infrared imaging systems.

Figure 1:
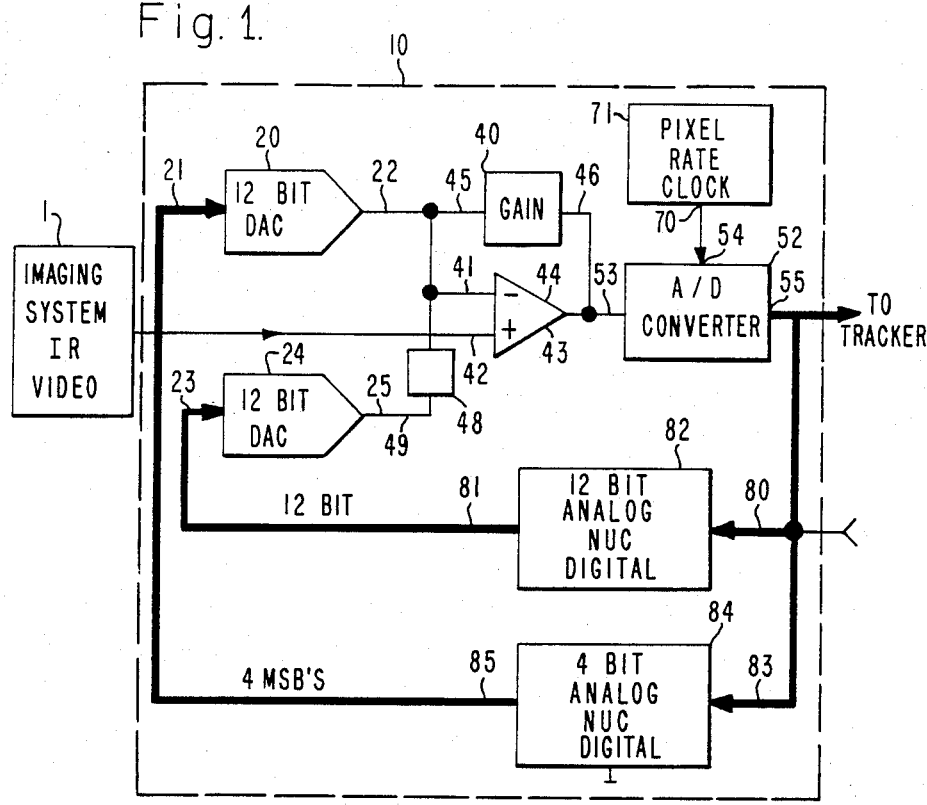
FIG. 1 is a schematic block diagram of a system incorporating the compensation technique of the present invention.

FIG. 1 provides a schematic block diagram of a system incorporating the compensation technique of the present invention. Appropriate imaging systems, known to those skilled in the art are used to provide an input IR video signal by focusing an image on a multi-element focal plane array, which is a two dimensional matrix of infrared sensitive detectors. As is known, included is a multiplexer which serializes the detector outputs for further processing. The serialized output is provided to the nonuniformity correction system 10 incorporating the method and system of the invention.

Upon entering the nonuniformity compensation system 10, the infrared video input signal is coupled to a positive input terminal 42 of an operational amplifier 44. The operational amplifier 44 also has a negative input terminal 41 selectively coupled to other system components as described elsewhere herein.

The operational amplifier 44 has an output 43 which couples an analog output signal to the input 53 of an analog to digital (A/D) converter 52. The A/D converter 52 may be for example, a 12 bit converter, and has an input 54 coupled to a pixel rate clock 71. The pixel rate clock 71 is used as a counter, for synchronizing the calculation of correction signal application of correction signals, etc.

The A/D converter 52 generates an output raw digital signal at an output 55. The output raw digital signal is coupled to a signal processor which could be, for example, tracking circuitry for a missile. More relevant for the discussion of the invention, the digital output signal is further coupled to input 80 of digital nonuniformity compensation (NUC) circuit 82 and an input 83 of NUC 84. The total number of digital bits of the raw digital signal depict the temperature range for the IR image. For example, for a 5° temperature range, $5/2^8$ degrees of resolution could be represented, or 5/256, or 0.02 degrees of resolution.

The NUC circuits 82 and 84 generate digital correction signals using the raw digital input signal from A/D converter 52. NUC 84 generates 4 digital bits used for coarse correction, whereas NUC 82 generates 12 digital bits used for fine correction, as will be further explained below. The number of bits can be increased or decreased as needed.

Figure 2:
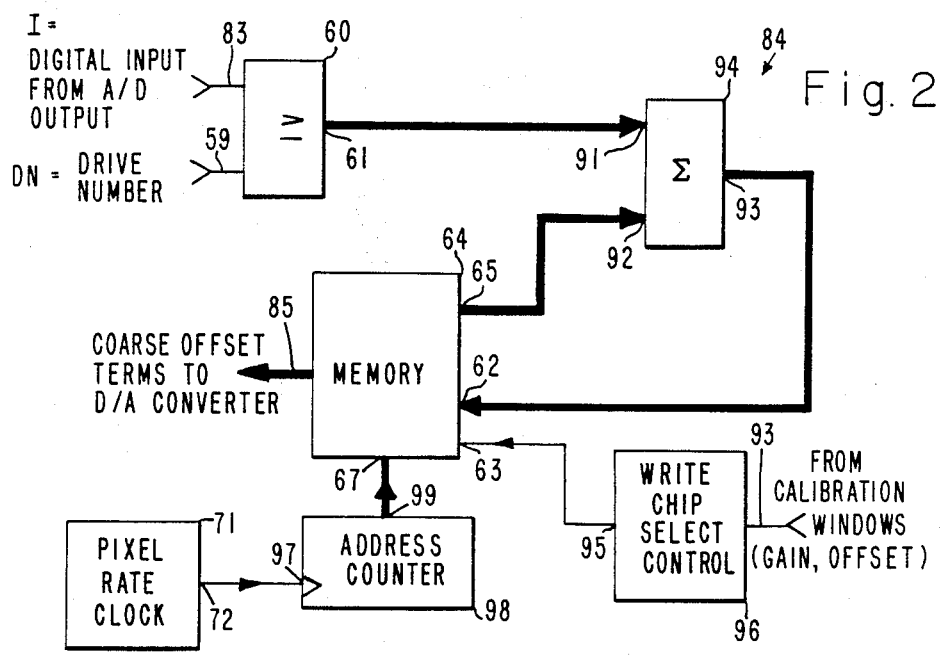
FIG. 2 is a schematic block diagram of a digital correction subsystem for a system incorporating the compensation technique of the present invention.

FIG. 2 depicts a block diagram of typical NUC circuit components used for the embodiment of this invention as shown in FIG. 1. Inasmuch as the circuit components described in FIG. 2 would be generally used in both NUC 82 and NUC 84, FIG. 2 will be discussed only once although it should be understood that variations from the NUC shown in FIG. 2 may be made by one skilled in the art depending on the specific correction processing technique employed without departing from the disclosed invention.

Repeating then, a raw digital output signal from A/D converter 52 is coupled to an input 80 of the NUC, in this case NUC 84. Input 80 is an input to digital comparator 60. Also coupled to an input 59 of comparator 60 is a "drive number". The drive number is a digital number chosen in this case to represent the midrange of A/D converter 52, however, the drive number can be any level.

The comparator 60 compares the drive number with the raw digital signal to generate a +1, 0, or −1 output signal, according to the relative value of the drive number compared to the input raw digital signal. The raw digital signal's most significant bit (MSB) can be also used to provide the +1 or −1 output signals in another embodiment. This output signal is coupled from output 61 of comparator 60 to input 91 of digital adder 94. Also coupled to an input 92 of digital adder 94 is a memory number from memory unit 64. Memory 64 is typically a static random access memory. The initial memory number is a random number, fed by memory 64 to input 92 of digital adder 94.

Digital adder 94 adds the memory number to the output of comparator 60 (+1, −1, or 0) to generate a new memory number. This new memory number is coupled from output 93 of adder 94 to input 62 of memory 64 and is stored in a designated memory location for the particular pixel.

A write chip select control unit 96 is also coupled from its output 95 to input 63 of memory 64. Gain, offset and similiar data are coupled to input 100 of control unit 96 from calibration windows. Pixel rate information is also coupled to an input 67 of memory 64 from the output 99 of address counter 98. Address counter 98 is used to synchronize the correction of pixel signals and is fed at input 97 from an output 72 of pixel rate clock 71.

The raw ditigal signal is thus processed by the NUC of FIG. 2 to generate a digital correction signal, ie, the new memory number. Refer again to FIG. 1. This digital correction signal is fed from an output 85 of memory 64 to an input 21 of a digital to analog converter (DAC) 20 (FIG. 1). A digital correction signal is likewise generated by a similar process in NUC 82 and is coupled in turn to an input 23 of DAC 24. The digital correction signal supplied to DAC 20 may be for example, a 4 bit input signal for providing coarse digital correction. The digital correction signal supplied to DAC 24 may be for example a 12 bit input signal for providing fine digital correction. DAC 20 is used to provide coarse offset correction by converting the 4 bit input digital signal into an analog correction signal. The analog correction signal is coupled from output 22 of DAC 20 to the negative input 41 of amplifier 44. DAC 24 is used to provide fine offset correction by converting the 8 bit input digital signal to an analog correction signal. The analog correction signal is coupled from output 25 of DAC 24 to the negative input 41 of amplifier 44 through resistor 48. Pixel gain nonuniformities may also be corrected by using DAC 20 in place of gain register 40, in which event, the reference input of DAC 20 would connect to position 45 and the output of DAC 20 would connect to position 46. DAC's 20 and 24 may be for example 12 bit converters commercially available from Analog Devices, Inc. Although the bit length for the converters need not be the same, the DAC's must be repeatable to the same degree of resolution.

For the embodiments of FIG. 1 and 2, the purpose of the invention is to eliminate DC gain and other nonuniformities between signals from the pixel elements. In operation, the embodiment of the invention as shown in FIG. 1 and FIG. 2 performs as follows. Initially, an uncompensated analog signal output of a particular pixel element is received by operational amplifier 44. The signal includes signal components representing nonuniformities peculiar to the particular pixel. Initially, no compensating signal will appear at the input 41 to amplifier 44. The output signal of the operational amplifier 44 is therefore an uncompensated analog signal. The uncompensated analog signal is then fed into A/D converter 52 and is digitized, thereby generating a raw digital signal. This raw digital signal is fed to signal processing circuitry, for example, tracker circuitry and is also fed to NUC 84. NUC 84 generates a coarse digital correction signal by processing the raw digital signal. More specifically, the raw digital signal is fed to the input 83 of comparator 60, which also is fed a drive number. The comparator compares the drive number, DN, to the raw digital signal, I. If I−DN>1, then the comparator has an output of −1; if I−DN<1, the comparator has an output of +1; and if |I−DN|<1, the comparator has an output of 0 (logical zero).

The output of comparator 60 is fed to digital adder 94 which is also fed a memory term from memory unit 64. The initial memory term is a random number, so that the memory unit would initially contain an array of random numbers, each corresponding to an initial memory term for a corresponding pixel. The digital adder would cause a +1, −1, or 0 to be added to the memory term, according to the logic previously discussed. The output of digital adder 94 is a new memory term which is fed back into memory unit 64 and written into the appropriate memory address for the pixel in place of the previous memory term. It can be seen that as the correction process is serially repeated for the pixel elements, an array of unique memory terms will be generated, each corresponding to a pixel element. The new memory term is now used as a digital correction signal and is fed back from the output 85 of memory unit 64 to the input 21 of DAC 20. DAC 20 converts the digital correction signal to an analog correction signal. The analog correction signal is coupled to the negative input 41 of amplifier 44. The uncorrected analog signal is thereby corrected by the analog correction signal, and a corrected analog signal is now provided from output 43 of amplifier 44. Gain compensation is achieved by using DAC 20, in place of gain resistor 40, and coupling the output 22 of DAC 20 to the output 43 of amplifier 44. The reference of DAC 20 is corrected to position 45. Now the new corrected analog signal is coupled to the A/D converter, digitized and again coupled to NUC 84 for generating a new memory term. As this process is successively repeated, eventually the comparator output will go to zero, the memory term will remain constant, and a constant correction signal will be applied for the output signal for its associated pixel element.

This process is repeated for each pixel element until the memory 64 finally contains an array of memory terms for which the comparator outputs are zero. In this way, a set of correction signals may be generated and stored in memory, each term providing proper nonuniformity compensation for each pixel element. The pixel rate clock 71 is used to synchronize generation of the proper correction signal, and to sychronize application of the proper correction signal to the corresponding pixel input analog signal.

In the depicted embodiment, a coarse correction is initially made by coupling the 4 most significant bits of the raw digital signal from the output 55 of ADC 52 to NUC 84. After an initial interval dependent on pixel rate and correction term calculation algorithm, the coarse correction is completed, and the system is fine tuned by the coupling of the raw digital signal from the output 55 of ADC 52 to NUC 82. After an additional interval dependent on pixel rate and correction term calculation algorithm, the fine tune correction is completed. Coarse, fine, and gain correction may be accomplished by coupling outputs 81 and 85 of NUCs 82 and 84 respectively through DAC's 20 and 24 respectively, and through gain resistors 40 and 48.

It can be seen that the invention is not of necessity limited to any particular correction algorithm and the embodiments shown are only for illustration and explanation. For example, the NUC shown in FIG. 2 could be replaced, in whole or in part, by other components and a different correction algorithm employed depending on the characteristic of the original analog signal to be corrected. In addition, a plurality of NUC's could be used successively in time, parallel in time, or as otherwise required to meet correction requirements.

The advantages of the invention are numerous. In one application, the invention accomplishes real time dc offset and gain compensation for over $2^8 \times 2^8$ pixel elements. The invention can be fabricated on chip, being of small size; is producible at low cost; and has very low power dissipation. The invention can provide greater than a 10 bit output corrected video signal at data rates up to 5 MHz. By using analog compensation, the full range of the input A/D converter can be retained for signal use.

Further, use of multiple NUC loops, and corresponding multiple DA converters with overlapping ranges, allows multiple low bit DAC's to be used in the place of a single high resolution DAC. For example, a 4 bit and a 12 bit DAC, operating closed loop with overlapping ranges, can replace a single 14 bit DAC converter. It is simply necessary to scale the fine control DAC such that its range is greater than the error plus one least significant bit of the coarse DAC. Precision in the coarse DAC is unnecessary because errors will be accommodated by the closed loop using the fine tune DAC.

It can also be seen that the invention may also be used to surmount limitations of digital correction techniques through the use of a combination of DAC's, processors and ADC's. Refer to FIG. 1. In that embodiment, a digital signal source (not shown) may be coupled to a DAC (not shown) to generate an uncorrected analog signal corresponding to the uncorrected digital signal. The analog signal may be thereafter processed in accordance with the correction methods previously discussed, so that the invention is useful to correct digital, as well as analog signals.

Depending on the nature of the nonuniformity, the data processor can employ processing techniques which quickly and efficiently eliminate the undesirable signal characteristics in real time; however, it is noted that high speed digital adders, multipliers, and other digital components must be used for the system to function. In addition, the data may be loaded at a slower rate than the actual pixel rate in order to reduce cpu through put requirements.

It can be seen that the present invention avoids the limitations of prior art techniques for nonuniformity compensation. Direct use of a temperature reference is avoided. Correction time is accomplished so fast that it is insignificant in real time. Even assuming the pixel nonuniformities are not constant over the environmental temperature range, an abrupt change in the background radiation would have minimal effect on the correction circuitry because the change would trigger automatic iteration of new correction terms. To periodically check the accuracy of the correction terms, the circuit could reinitiate the coarse/fine correction process and obtain a new set of memory terms in a period of time so short as to be insignificant in real time. It is also generally irrelevant whether the array is staring or scanning.

Figure 3A:
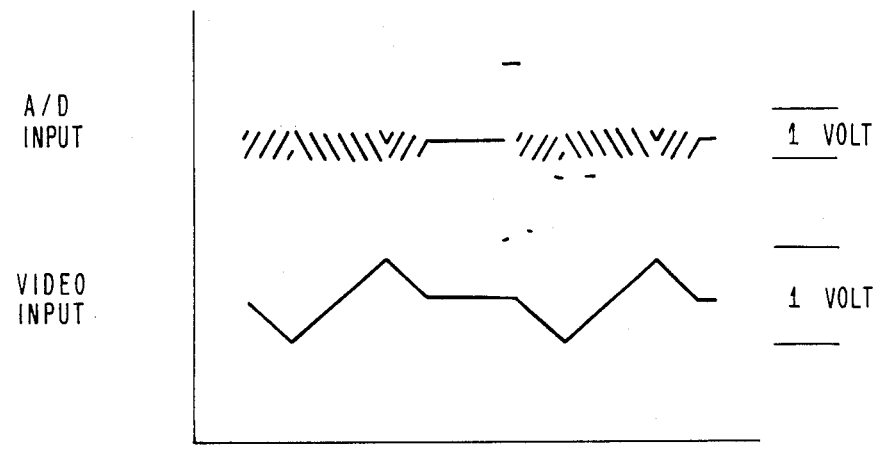
FIG. 3a depicts a representation of actual oscilloscope images of a raw uncorrected video signal and the signal after coarse 4 bit compensation.
Figure 3B:
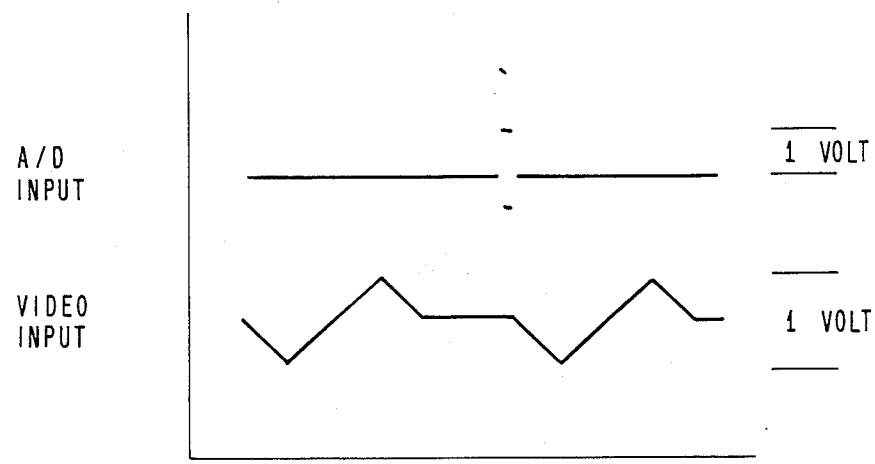
FIG. 3b depicts a representation of actual oscilloscope images of a raw uncorrected video signal and the signal after undergoing coarse (4 bit) and fine (12 bit) compensation.

FIGS. 3a and 3b are graphic depictions of the outputs of A/D converter 52 for an input video signal (analog) which has undergone 4 bit and 12 bit compensation respectively. These figures clearly demonstrate how nonuniformities may be eliminated for elements of a focal plane array using the teachings of the inventor.

Although typical embodiments of the invention have been illustrated and discussed above, it is apparent that numerous modifications and alternative embodiments of the apparatus and method of this invention will be apparent to those skilled in the art in view of this description. Accordingly, this description is to be considered as illustrative only and is provided for the purpose of teaching those skilled in the art the manner of constructing the apparatus and performing the method of this invention. Various changes may be made in the actual choice of configurations, components, applications, and arrangements of components without departing from the scope of the invention.

Equivalent elements, for example, might be substituted for those illustrated and described herein, and certain features of the invention might be utilized independently of the use of other features, all as will be apparent to one skilled in the art after receiving the benefit obtained through reading the above described invention.

What is claimed is:

1. Apparatus for correcting an analog signal for undesirable signal components comprising:
   means for receiving said analog signal and providing an output indicative of the sum of said analog signal and a first value of analog correction signal;
   means for digitizing said output indicative of said sum whereby a raw digital signal is provided;
   means for storing a first digital signal representative of said first value of analog correction signal;
   comparator means, coupled to said means for digitizing, for comparing said raw digital signal to a reference drive number and for generating an output indicative of said comparison;
   combining means, coupled to the output of said comparator and to said means for storing, for combining said output indicative of said comparison with said first digital signal and for generating as output a second digital signal;
   said second digital signal being coupled to said means for storing whereby said second digital signal replaces said first digital signal in said means for storing; and
   means for converting said second digital signal to a second value of analog correction signal and providing said second value of analog correction signal to said means for receiving.

2. Apparatus according to claim 1 wherein said reference drive number is a digital signal representative of the midpoint of signal levels within the dynamic range of said means for digitizing.

3. The apparatus according to claim 1 wherein the first and second digital signals each has a bit length less than the bit length of the raw digital signal.

4. The apparatus according to claim 1 wherein the means for converting comprises a digital-to-analog converter having a bit length less than the bit length of the raw digital data.

5. Apparatus for correcting each member of a train of analog signals for undesirable signal components comprising:
   means for successively receiving each member of said train of analog signals and, for each member, providing a respective output signal indicative of the sum of said member and a respective first value of analog correction signal;
   means for digitizing said respective output signal indicative of said sum whereby a respective raw digital signal is provided for each member of said train;
   means for storing a plurality of first digital signals each of said plurality being representative of the first value of analog correction signal for a respective member of said train;
   comparator means, coupled to said means for digitizing, for comparing each respective raw digital signal to a reference drive number and for generating a corresponding output for each said comparison;
   combining means, coupled to the output of said comparator and to said means for storing, for combining each output of said comparator means with a corresponding one of said plurality of first digital signals and for generating a corresponding plurality of second digital signals as output;
   said output of said combining means being coupled to said means for storing whereby each of said plurality of second digital signals replaces a corresponding first digital signal in said means for storing; and
   means for successively converting each of said plurality of second digital signals to a corresponding plurality of second values of analog correction signals and successively providing each said second value of analog correction signal to said means for receiving.

6. Apparatus according to claim 5 wherein said reference drive number is the same value for each respective raw digital signal processed by said comparator.

7. Apparatus according to claim 6 wherein said reference drive number is a digital signal representative of the midpoint of signal levels within the dynamic range of said means for digitizing.

* * * * *